No. 706,439. Patented Aug. 5, 1902.
H. M. McCALL.
MOTOR VEHICLE.
(Application filed Mar. 7, 1902.)
(No Model.) 2 Sheets—Sheet 1.
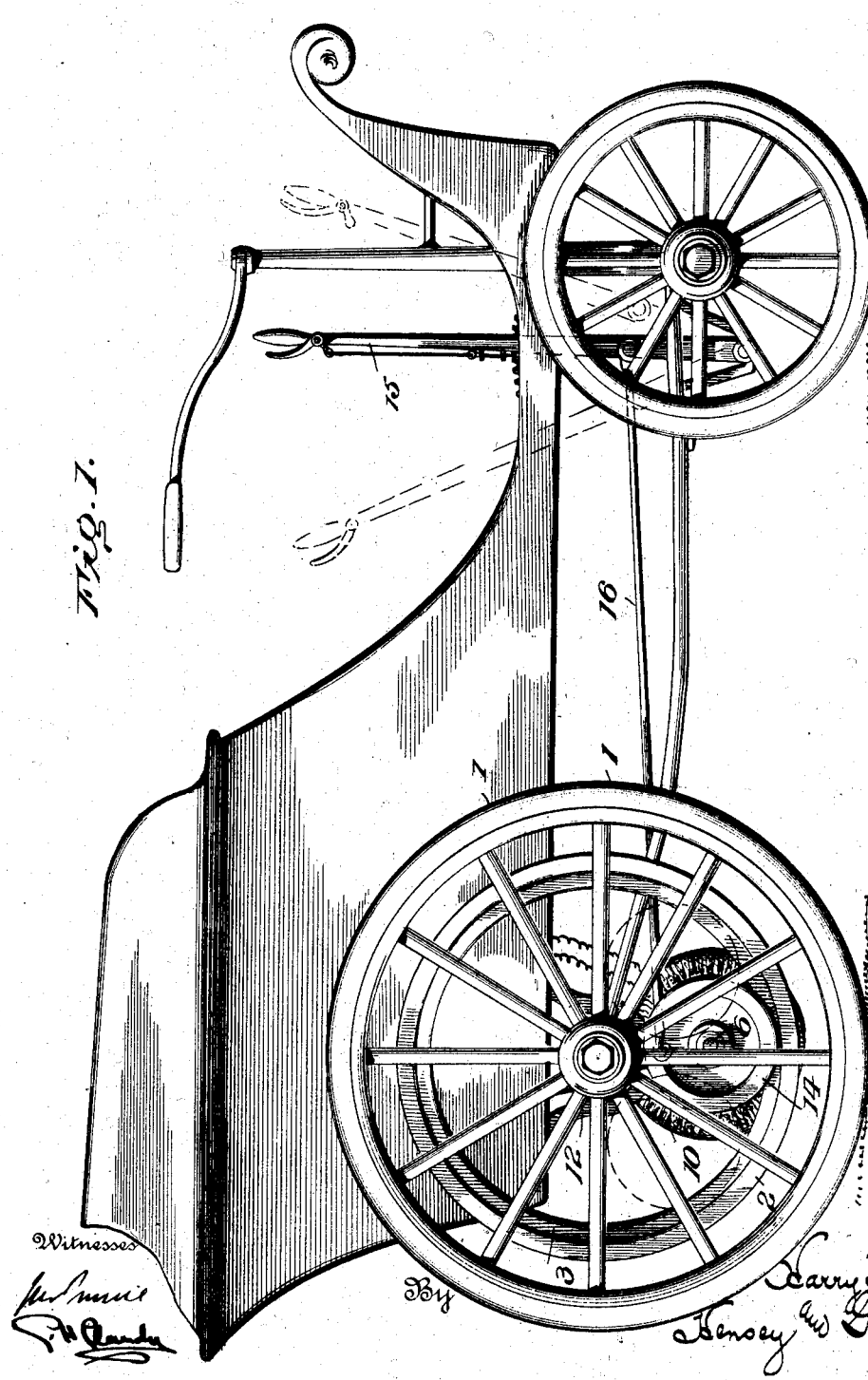

No. 706,439. Patented Aug. 5, 1902.
H. M. McCALL.
MOTOR VEHICLE.
(Application filed Mar. 7, 1902.)
(No Model.) 2 Sheets—Sheet 2.
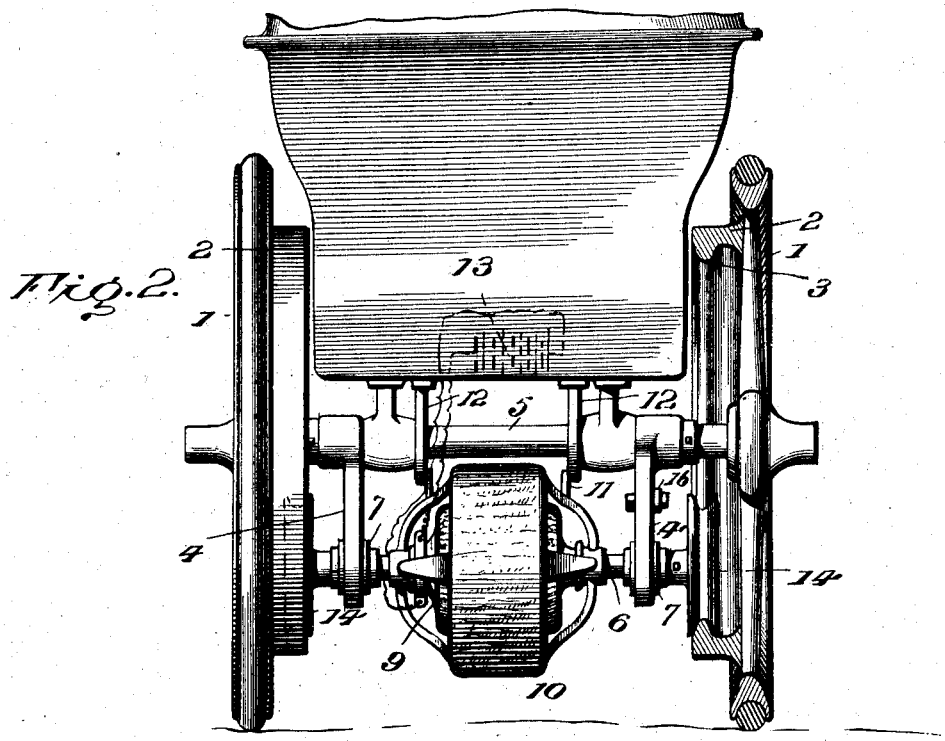
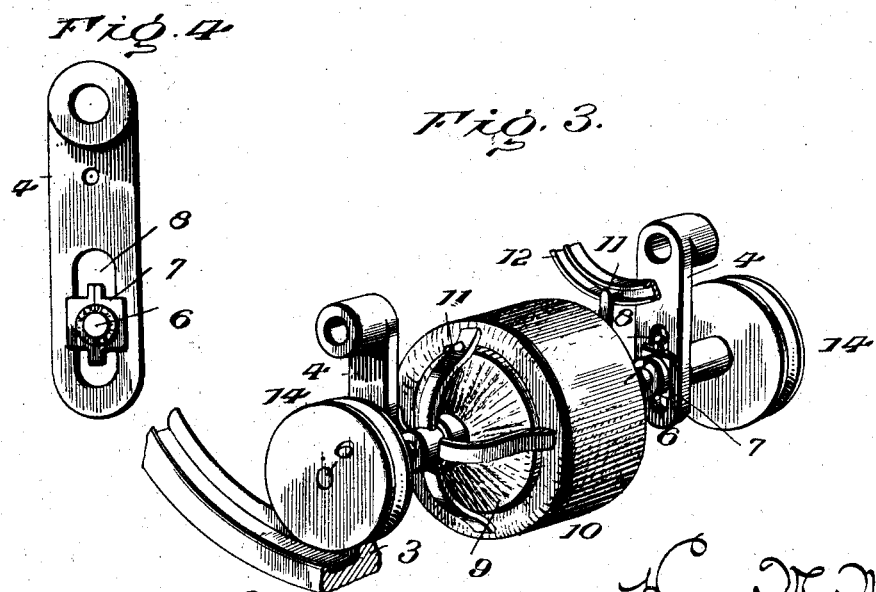

UNITED STATES PATENT OFFICE.

HARRY M. McCALL, OF PITTSBURG, PENNSYLVANIA, ASSIGNOR OF FIVE-EIGHTHS TO JAMES REES SONS' COMPANY, OF PITTSBURG, PENNSYLVANIA.

MOTOR-VEHICLE.

SPECIFICATION forming part of Letters Patent No. 706,439, dated August 5, 1902.

Application filed March 7, 1902. Serial No. 97,077. (No model.)

*To all whom it may concern:*

Be it known that I, HARRY M. MCCALL, a citizen of the United States, residing at Pittsburg, in the county of Allegheny and State of Pennsylvania, have invented certain new and useful Improvements in Motor-Vehicles, of which the following is a specification, reference being had to the accompanying drawings.

This invention has relation to automobiles; and it consists in the novel construction and arrangement of its parts, as hereinafter described.

The object of this invention is to provide an automobile with a simple and effective means for transmitting rotary motion to the traction-wheels thereof, the traction-wheels being provided with annular concentrically-arranged flanges, disks adapted to engage the inner faces of said flanges being fixed to the ends of the motor-shaft, the motor being located on said shaft, the motor-shaft and its attachments being adjustably suspended from the axle of the traction-wheels, and a suitable means for adjusting the position of the motor-shaft and its attachments.

In the accompanying drawings, Figure 1 is a side elevation of an automobile provided with my improvements. Fig. 2 is a rear end view of an automobile provided with my improvement, showing one traction-wheel in section. Fig. 3 is a perspective view of the motor-shaft and its attachments. Fig. 4 is a detailed side view of one of the pivoted arms for guiding the motor-shaft, showing a sliding journal-box located in the lower end of said arm.

Each of the traction-wheels 1 is provided on its inner face with an annular flange 2, said flange being concentrically arranged upon the said traction-wheel. The inner face of said flange 2 is provided with an annular inwardly-extending projection 3, forming a track. The motor-shaft-support arms 4 4 are journaled at their upper ends to the axle 5 of the traction-wheels 1, said arms 4 4 having journaled in their lower ends the motor-shaft 6. The motor-shaft 6 passes transversely through the boxes 7, an ordinary ball-bearing being provided between the said shaft and the said boxes. The boxes 7 are slidably mounted in the elongated openings 8 at the lower ends of the said arm, as shown in detail in Fig. 4. Using the said arms 4 4 as a radius, the motor-shaft 6 and its attachments are adapted to make a partial rotation about the traction-wheel axle 5, as indicated by the dotted lines in Fig. 1.

The armature 9 of the motor is fixed to the motor-shaft 6, while the field 10 of the said motor is supported by the said shaft 6, the said field 10 being held against rotation by means of lugs 11, the upper ends of which pass up and enter the semicircle guides 12, which are attached to the body of the vehicle. The semicircle guides 12 12 are concentrically arranged with relation to the axle 5. The current is supplied to the motor from a storage battery 13, suitably mounted on the body of the vehicle. The disks 14 14 are attached to the ends of the motor-shaft 6, said disks resting upon the annular track 3 of the flanges 2. The entire weight of the motor-shaft and its attachments is communicated through the disks 14 to the flanges 2, the arms 4 4 simply serving as guides to pass the motor-shaft and its attachments to the front or to the rear, as occasion may require.

For moving the motor-shaft and its attachments a lever 15 is provided, said lever being suitably fulcrumed at its lower end to the framework of the vehicle, being connected by means of a rod 16 with one of the arms 4. It will be seen that when the upper end of the lever 15 is moved by the operator toward the dashboard of the vehicle the rod 16 will be drawn forward. The motor-shaft 6 and its attachments will be drawn in front of the center of the traction-wheels 1. Thus the entire weight of the motor-shaft 6 and its attachments will be applied to the inner face of the flanges 2 in front of the center of the traction-wheels 1. By reversing the operation of the lever above described the motor-shaft 6 and its attachments may be carried behind the center of the traction-wheels 1. The advantage of this adjustment of the weight of the motor-shaft and its attachments is that when the vehicle is moving forward the weight of the parts above mentioned may be transferred to the front of the center of the traction-wheels, and thus the said weight is utilized in assisting in revolving the said traction-wheels on substantially the same principle that the application of a weight in a treadmill on either side of the center of the wheel causes the wheel to revolve in that direction. When the vehicle is backing, the motor-shaft and its attachments are thrown behind the center of the traction-wheels with the same effect as above set forth. When the vehicle is traveling on level ground, the motor-shaft and its attachments may be substantially alined with the perpendicular central axis of the traction-wheel, if the operator finds it advantageous to do so. The rotary motion is transmitted to the traction-wheels by means of the revolving armature 9, causing the shaft 6 to revolve, which in turn causes the disks 14 to revolve. The said disks bearing upon the track 3 causes said track 3 and the traction-wheels to revolve in the same direction that the disk 14 is revolved in.

Having described my invention, what I claim as new, and desire to secure by Letters Patent, is—

1. A motor-vehicle consisting of a traction-wheel having a track concentrically located thereon, a motor-shaft having a disk adapted to engage said track, and a suitable guide for the motor-shaft, whereby the said shaft may be moved in the arc of a circle about the center of the traction-wheel, a means for operating the guide, a motor mounted on said shaft, the weight of the motor, the shaft and their attachments being borne by the said track.

2. A motor-vehicle consisting of a traction-wheel, a track concentrically arranged upon said traction-wheel, a motor having its armature fixed to a motor-shaft, said motor-shaft having at its end a disk adapted to engage said track, a guide adapted to move said shaft and its attachments in the arc of a circle, a means for supporting the field of the motor and hold it against revolution, but permit it to rotate in the arc of a circle and a means for operating the guide.

3. A motor-vehicle consisting of a traction-wheel, a track concentrically arranged on said traction-wheel, a motor consisting of an armature and a field, a support for said field adapted to retain it against revolution, but permit it to rotate in the arc of a circle, a motor-shaft fixed to said armature, a disk carried by said motor-shaft and adapted to engage said track, a guide adapted to move said shaft and its attachments in the arc of a circle, and a means for operating said guide.

4. A motor-vehicle consisting of a traction-wheel, a track concentrically arranged upon said traction-wheel, a motor-shaft, a disk arranged on said shaft and adapted to engage said track a guide adapted to rotate said shaft in the arc of a circle, said guide having at its lower end an elongated opening receiving said motor-shaft and a means for operating the motor-shaft and said guide.

5. A motor-vehicle consisting of a traction-wheel, a track concentrically arranged upon said traction-wheel, a motor-shaft adapted to rotate in the arc of a circle, a disk attached to said shaft and adapted to engage said track, a guide having an elongated opening, a sliding box carried by said opening, said motor-shaft being journaled in said box, and a means for operating the motor-shaft and the guide.

6. A motor-vehicle consisting of a traction-wheel, a track concentrically arranged upon said wheel, a motor consisting of an armature and a field, a motor-shaft fixed to said armature, a disk carried by said motor-shaft, said disk adapted to engage said track, a guide adapted to move said motor-shaft and its attachments in the arc of a circle, a means for operating said guide, guides for the motor-field, said guides being so constructed, arranged and connected with the motor-field whereby the same is held from rotation, but permitted to move in the arc of a circle.

In testimony whereof I affix my signature in the presence of two witnesses.

HARRY M. McCALL.

Witnesses:
MARY L. MILLARD,
ANNA ELIZABETH STULL.